Sept. 3, 1963 J. LUND 3,102,618
TWO-DIRECTIONAL TORQUE COUPLING AND CLUTCH MECHANISM
Filed Jan. 23, 1961

INVENTOR.
JOHAN LUND
BY Whittemore, Hulbert
Belknap
ATTORNEYS

United States Patent Office 3,102,618
Patented Sept. 3, 1963

3,102,618
TWO-DIRECTIONAL TORQUE COUPLING
AND CLUTCH MECHANISM
Johan Lund, Detroit, Mich., assignor to Formsprag Company, Warren, Mich., a corporation of Michigan
Filed Jan. 23, 1961, Ser. No. 84,386
2 Claims. (Cl. 192—8)

The present invention relates to improvements in a mechanism for a two-directional transmission of rotative shaft power, as between driver and driven members or shafts, and for insuring against the reverse transmission or feed back of power, from the driven to the driver, in either rotative direction. The mechanism is of the sprag and race type, characterized in that the sprags act between a rotative race, on which they are socketed for tilting movement, and a fixed race, thus to be capable of selective wedging or sliding engagement with the fixed race in response to the actuation of certain control provisions. The present application is a continuation-in-part of my copending application, Serial No. 795,974, filed February 27, 1959, now abandoned.

A mechanism or device having these capabilities, as a two-directional anti-reverse feedback unit, has numerous applications in a wide variety of fields. For example, it may be employed in a rudder and/or aileron control system for high speed aircraft or missiles, in which it is desirable to have an extremely delicate, bi-directional adjustment of the rudder, aileron or similar stabilizer parts, but without any possibility that they will be dislodged from adjusted position under extremely strong air flow forces tending to set up destructive vibrations.

On the other hand, a mechanism in accordance with the invention is also applicable in a heavy duty control, involving the transmission of heavy mechanical forces in two directions, with an anti-reverse or anti-kickback action as described above. A typical installation is in the control of the scraper blade of a bulldozer or like heavy duty grading equipment, in which it is desirable to provide for the elevation and depression of the blade, while preventing its vertical movement in either direction when actually in service and moving earth.

Application in automotive steering controls and the like, involving bi-directional rotative control or adjustment, without the possibility of reverse shock or kickback in either direction, application in the control of load hoists, in conjunction with suitable reduction gearing, and many others of widely varying character, but in common presenting the requirement of two-directional and anti-reverse control, will readily suggest themselves to those skilled in the art.

There has heretofore been proposed for the purpose a type of bi-directional power transmission mechanism involving the use of a single force-transmitting and locking member extending diametrically of aligned input and output shaft members and coacting with an outer fixed race to prevent reverse action from the output to the input, while permitting forward, input-to-output power transmission in either rotative direction. However, the excessive frictional wear borne by such a power transmitting and locking member shortens its life greatly. Moreover, the mechanism is unbalanced or eccentric under load, resulting in the application of undesirable shaft thrust in one radial direction or another, as the result of an eccentric or unbalanced application of the wedging and locking force.

Moreover, devices of this type have the further disadvantage in that there is a rotative lost motion both when the device goes into driving condition in either direction and when it goes into a condition to lock against reverse, output-input drive. This signifies that undesirable shock takes place at both of these transition stages.

Still another type of mechanism has been proposed for the purpose, in a considerable variety of applications. This is a type of free-wheeling mechanism, involving the use of pairs of rollers or balls, the elements of each pair being spring urged in opposite directions within a space of varying radius, as between a cylindrical raceway and a non-cylindrical cam-shaped wedge member. In a unit of this sort, considerable frictional wear takes place on the rollers, the spring means, the race and the cam or wedging member, in either direction of driving rotation as well as in locking, tending to decrease life. Moreover, this free-wheeling roller type of unit inherently requires the use of individual springs to urge the respective rollers of the several pairs in opposite directions, so that each roller may quickly wedge between the cam and race when driving. There results an increased factor of assembly time, as well as the possibility of spring non-uniformity producing improper action.

It is therefore a general object of the invention to provide an improved two-directional drive and anti-reverse mechanism of the general sort described, which operates on the principle of the known type of sprag clutch; and which therefore may be produced in various types and sizes best suited to the requirements of a wide number of installations ranging from the lightest to the heaviest sort of duty, but all capable of instantaneously locking against reverse action, as from the driven to the driver.

A further general object is to provide a two-directional sprag and race control mechanism, featuring sets of sprags oriented oppositely in the circumferential sense.

The sprag type anti-reverse feedback mechanism of this character has the advantages over other previously proposed types, in that the transmission of radial thrust under anti-reverse locking action in either direction is absolutely balanced circumferentially and concentrically of the line of power transmission, there being no tendency to bias the axis eccentrically in any phase of locking or power transmitting operation. By reason of the use of a relatively large number of the sprags, the individual unit load on any one thereof is small, indeed. Furthermore, the sprag type construction permits the use of one or two well known coil type garter springs of continuous annular outline to exert a necessary tilting bias to maintain the sprags in position for instantaneous locking action against a fixed race. Uniformity of thrust on all of the sprags is insured, and assembly thereof between relatively rotatable members is facilitated and expedited.

In general, it is an object to provide a bi-directional sprag mechanism, including sprags socketed at one end on a rotatable race and having selective sliding or wedging engagement at the opposite end with another race, fixed or rotatable in accordance with the particular adaptation, together with spring means continually urging the sprags in contact with said other race for sliding or wedging engagement with the latter. Thus, instantaneous resumption of anti-reverse locking or driving engagement with the last named race takes place for respectively unlocking a member for rotation in either direction, or for resumption of driving engagement of an overrunning member with a driver.

It is a further object of the invention to provide a mechanism as described, in which individual locking sprags are at all times socketed at one of their ends (herein illustrated and described as the inner end) on a race which serves as a locking anchor or reaction member. This socketed feature improves the control of the sprags in uniformly and simultaneously wedging against the fixed locking race. It also increases the life of the sprags by diminishing the total wear thereon; and, needless to say, the unit wear and pressure on all sprags are uniform and minimum in degree.

Furthermore, due to the fact that the socketing of the sprag end in the race enables a close conforming of the meeting surfaces with one another, the device is capable of sustaining a considerably greater torque load than devices heretofore proposed for a like purpose.

Another object is to provide a socketed sprag type of control mechanism in which sets or pairs of sprags are disposed in oppositely oriented relation to one another between opposed cylindrical race surfaces, one of these being a driven race member in which the sprags are socketed and the other being a locking race member; and in which an initial minute tilt of all corresponding sprags of the sprag sets or pairs, as by control fingers on a driver, releases wedge surfaces of these sprags from the locking race member. The tilting movement follows a very slight lost motion increment in either direction of the power input member of the mechanism, after which the driver's control fingers engage the sprags adjacent their socketed ends to power the driven race member through its sockets. However, the mechanism locks instantaneously and without lost motion to prevent output-to-input transmission. Still further, this is done without any degree of shock, both in the application of driving torque in either rotative direction, and in locking against reverse, output-input drive in either direction.

In all anti-reverse torque feedback embodiments of the invention, two coaxial race members are employed, one (preferably the outer member) being fixed and presenting a cylindrical race surface against which the sprags wedge at one end in locking. The other member is a race or reaction member on which the opposite ends of the sprags are socketed. This member always rotates with one of the two axially aligned power transmitting members of the mechanism (illustrated as the input member).

In accordance with one design option (a preferred one) the sprags are arranged in oppositely oriented pairs in equal circumferential spacing about the races, but in accordance with another adaptation they may be arranged in uniformly oriented sets of more than two each, which sets are spaced about the rotative axis with the sets in opposite circumferential orientation.

The foregoing as well as other objects will become more apparent as this description proceeds, especially when considered in connection with the accompanying drawings illustrating the invention, wherein.

Figure 1:
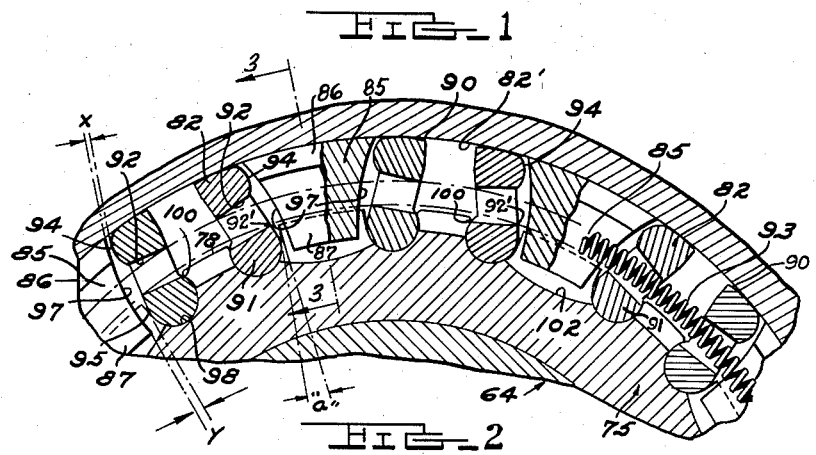
FIG. 1 is a view, enlarged in scale for clarity, in transverse vertical section through an alternative embodiment, as along the line 1—1 of FIG. 2.
Figure 2:
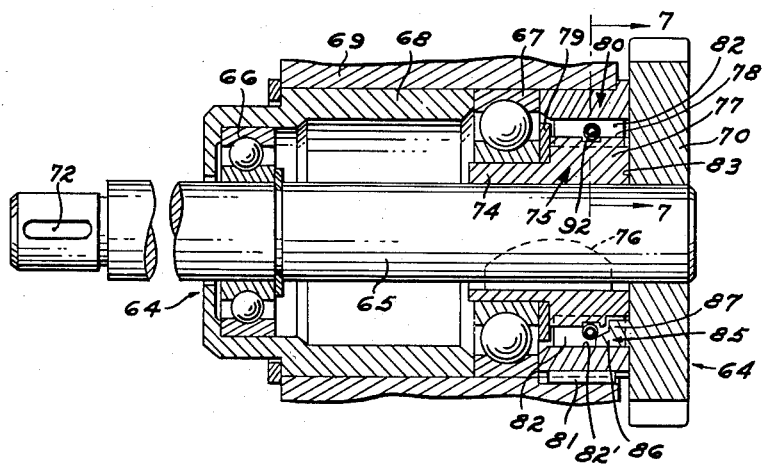
FIG. 2 is a fragmentary view in longitudinal section through the axis of the mechanism of FIG. 1.
Figure 3:
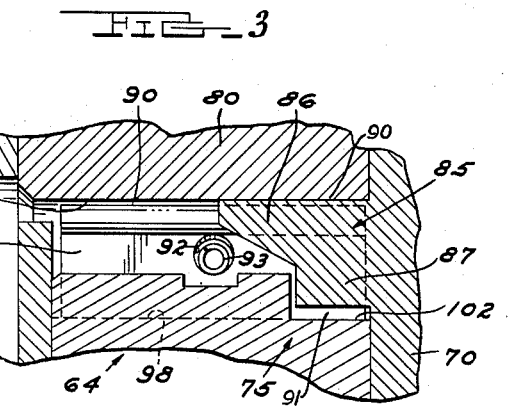
FIG. 3 is a fragmentary view in radial section along line 3—3 of FIG. 1.

FIGS. 1, 2 and 3 of the drawings illustrate a preferred embodiment of the principle of the invention in a two-directional, anti-backlash drive mechanism, generally designated by the reference numeral 64. It is characterized in that the sprag components thereof bear a minimum unit load, due to the distribution of forces over a large number of the elements; and it is likewise perfectly balanced to said radial thrust in all directions.

Referring first to FIG. 2, the mechanism 64 comprises a somewhat elongated driven shaft 65 suitably journalled by ball bearings 66, 67 within a bearing or mounting sleeve 68 fixedly carried by a housing 69. A power input or drive gear 70 is journalled, directly or otherwise, on an end of the shaft externally of the housing structure, and the opposite end of the shaft 65 extends from the opposite end of the bearing sleeve 68, where it is provided with a suitable formation 72 for a powered output connection. Appropriate provisions are made to restrain the various parts against axial movement relative to one another.

The inner race of the bearing 67 surrounds and is fixedly secured to an axial hub portion 74 of an inner race or reaction member 75 of the mechanism 64, which member is fixed for rotation with the shaft 65, as by a key 76. A radial enlargement 77 of the race or reaction member 75 is formed in a manner to be described to provide an outer socket surface 78 thereon, and a spacer washer 79 separates this portion of the inner race 75 from the adjacent ball bearing 67.

The reference numeral 80 designates the outer race of the mechanism, which is fixedly carried in and adjacent an end of the mounting or housing member 69; and an axial pin 81 disposed in mutually facing recesses of the outer race 80 and the member 69 serves to key these two members together and resist relative rotation. The locking action is supplemented by the action of the locking sprags 82 as they are wedged outwardly against the cylindrical surface 82' of outer race 80, thus expanding the latter into frictional holding engagement with the mounting or housing member 69.

In accordance with the embodiment illustrated in FIGS. 1–3, the driving gear 70, or other equivalent driver, is formed to provide on the face 83 thereof a plurality of control fingers 85, which not only have the control function of initially tilting the locking sprags 82, but also of engaging and transmitting force through these sprags upon a still further slight rotative motion of driver 70 and the fingers. To this end, the control fingers 85 are provided with axial extensions 86 on their radially outermost portions, for the purpose of the initial tilting action after a slight lost motion travel in either rotative direction, and body portions 87 which thereafter engage and drive the sprags in a manner to be described.

It is to be noted by reference to FIG. 3 that, although the tilting extension portion 86 of each sprag 85 is offset slightly in the axial direction relative to the driving body portion 87, nevertheless these portions engage the sprag in substantially a common radial and vertical plane normal to the race axis and within the axial limits of the sprag.

As depicted in FIG. 1, the locking sprags 82 are disposed in pairs in circumferentially opposed, mutually facing relation to one another. Each sprag has an outer arcuate cam or wedging surface 90, an inner, semi-cylindrical socket formation or portion 91, and central apertures 92 receiving the contractile garter spring 93, which engages the sprags to tilt the same oppositely in directions to engage the outer race surface. A rounded heel portion 94 on the outer ends of each locking sprag 82 is engageable by the control finger extension 86, while the rear portion 95 of the socket formation 91 of each sprag is engageable by an adjacent body portion 87 of the control finger 85, all in a manner to be hereinafter described in greater detail.

It is thus seen that each of the sprag elements 82 is in the cross-sectional outline of a column or strut, being formed at its radially outer end to provide an arcuate wedging and anti-rotation locking surface 90 such as is characteristic of the other known types of sprag. The opposite inner end 91 of each of the sprags is formed to provide a socket element of generally semi-cylindrical cross-sectional outline, in a diameter somewhat greater than the width (in the circumferential sense) of the portion of the sprag directly outward thereof. As shown in FIG. 3, sprags 82 are of a width, in the axial direction, approximating that of the outer race 80.

The sprags 82 are identical, but as disposed in pairs to extend between the inner and outer races 75, 80, respectively, they are in opposing relation to one another.

The sprags 82 of each pair are resiliently urged in opposite directions to engage their wedging faces 90 with the outer race surface 82'. This function is performed in a known manner by the annular wire garter spring 93 threaded through the center openings 92 in the respective locking sprags, the inclination of the openings 92 being such that radially outermost inner edges 92'

(FIG. 1) thereof are engaged by the spring 93 in a contractile way. Thus, as viewed in FIG. 1, the left-hand sprag 82 of each opposed pair is continually urged counterclockwise about the axis of its inner socket portion or formation 91, and the right-hand sprag of the same pair is urged clockwise about its corresponding axis.

It will also be observed by reference to FIG. 1 that the sprag elements 82, as received in the spaces between successive control fingers 85 of driver 70, and with the mechanism in an idle, non-driving and non-locking condition, are at their outer tilting portions 86 spaced slightly a distance "x" in the circumferential sense from the adjacent edges of the fingers 85 either side of the pair. This slight clearance is taken up upon initial rotation of the driver 70 in either direction, whereupon the finger tilts the engaged sprag toward its mate slightly but sufficiently to release it from wedging and locking engagement with the outer race surface 82' of the mechanism. Since the other locking sprag of the pair is oriented in opposition to the engaged element and may thus slide freely around the race surface 82' in the direction the driver 70 is rotated, it follows that the mechanism 10, as thus unlocked, is capable of having its inner race or reaction member 75 rotated by the driver through the agency of the tilted sprag, as will be described.

The mildly rounded cam or gripping surface 90 of the sprag 82 has its center of curvature offset somewhat in the circumferential sense from the axis of its socket or trunnion portion or end 91. This insures that the sprag has a constant gripping angle relative to the axis of rotation of the race in which it is socketed as the socket end moves in the locking direction. The cam or gripping surface 90 moves a similar amount, the sprag being held at a constant angle to the race radius.

In the machining of the drive gear 70 or equivalent driver, the control fingers 85 may be formed by a single end mill operating on different centers, to provide the mutually facing arcuate driver surfaces thereon which perform the tilting and driving actions referred to above, these surfaces being designated 97. The contour of the fingers 85 in axial cross section is clearly illustrated in FIG. 3.

Referring again to FIG. 1, it will be noted that in the machining of the radial outer enlargement 77 of the inner race or reaction member 75 to provide the socket seats 98 for the pairs of sprags, the milling cuts are made relatively deep, and that these cuts open outwardly through the outer surface 78 of race 75 at angles slightly less than radii of said surface. These angles, designated "a" in FIG. 1, amount to about 10 degrees, in a typical unit, and they incline to the rear in respect to the direction of rotation of the driver 70 and its control fingers 85. Thus it is seen that when the fingers 85 are initially rotated slightly in either direction to traverse the lost motion clearance space "x" (FIG. 1) and engage and release the sprag element at its radially outer portion from wedging contact with the outer race, the outer edges 100 of the socket seats 98, as thus formed, will each in effect constitute an overhang by which the socket formation 95 is restrained from outward movement from its seat under driving and centrifugal force. Surfaces 97 and 100 create a wedge around the sprag cylindrical end that prevents the sprag from popping out under driving conditions. This effect is important in the operation of the unit. Upon further rotative movement in either direction of the driver 70 and control fingers 85, the body portions 87 thereof, after traversing the remainder of the slight clearance space "y" will engage the radially inner portions 95 of the socket formations 91 in the same radial plane normal to the axis of shaft 65, and will thereafter drive the inner race or reaction member 75 (and the shaft 65 to which the latter is keyed) in a positive fashion.

Thus the embodiment of FIGS. 1, 2 and 3 is seen to be capable of very heavy duty work without causing undue stress to be imposed on any component, due to the presence of a multiplicity of control and drive fingers on the driving member 70, and the use of a multiplicity of locking sprags disposed in mutually facing pairs. Shaft 65 may be driven in either rotative direction, but will not be moved in either direction by the application of torque to its output end 72; and this locking action is instantaneous, without any degree of lost motion or shock whatsoever, such as is present when the drive is from the input side.

It is seen by reference to FIGS. 1 and 3 that the inner race member 75 of the mechanism may be cut away somewhat, as at 102, in order to accommodate the radially inwardly extending body porton 87 of each of the control and drive fingers 85.

The control mechanism is simple and inexpensive in its construction and as to the assembly of its parts. Wear on the sprag components is reduced to a minimum by socketing them in the inner race or reaction member 75, in the seats 98 of which the sprags 82 have a practically motionless reception. Radial load is uniformly distributed through a relatively large number of struts or columns, and there is no unbalanced or non-eccentricity of thrust in this sense, as has been the case in mechanisms previously proposed for a similar purpose. Thus, for any particular design for a given particular duty the stressed parts may be dimensioned smaller than in known units, at correspondingly reduced production costs. Driving torque is transmitted in either rotative direction without damaging shock, and the device locks in its anti-reverse condition instantaneously, also without any degree of shock.

In any of the above embodiments the structure differs in character and operation from previous arrangements for a generally similar purpose, in that the sprag elements are non-rotating in action, save for the slight requisite initial tilt in releasing for drive. On the contrary, they are socketed at the non-wedging end thereof, as a further distinction and improvement over the prior art. Locking action is instantaneous, without back-lash. Locking torque and/or driving load under low unit stress may be distributed over a large number of components, and, moreover, in a uniform and balanced fashion, as well as under minimum wear on all components.

Manufacturing cost is lessened since the mechanism does not employ specially shaped cam members other than the sprags, which are mass produced at slight cost. Assembly is facilitated and uniformly distributed spring bias insured by the use of garter springs, rather than multiple compression springs. Furthermore, the load bearing capacity, in any given design and within limits imposed by size and like considerations, can be increased to any desired extent by simply increasing the number of sprags and associated components.

Since the fingers 85, as driven by the driver 70, first engage the outer parts of the sprags 82 to tilt them from wedging engagement with race 80, and then engage the inner socket parts 95 of the sprags to drive the inner race 75 and the output shaft 65 at the sockets 98, these actions both taking place in a common radial plane normal to the axis of shaft 65, it follows that the structure may be made very compact in the axial direction. Moreover, no pivot pins or like shearable parts nor special drive parts are employed in the control structure, thus contributing to reliable operation and decreased production cost.

The principles of the invention, it will also be recognized, are widely applicable in anti-back drive mechanisms for the lightest to the heaviest sort of duty, and an extreme delicacy of response in any installation and under all types of conditions is to be expected.

What I claim as my invention is:

1. A two-directional, anti-reverse feedback, torque transmitting device, comprising a first member having a smooth, fixed cylindrical race, a further member disposed in a rotatable relation to said first member coaxially of said race of the latter and having a race including a peripheral surface radially spaced from said first named race and provided with rounded sockets opening radially relative to said peripheral surface, means providing a torque connection between said races which is effective in either angular direction, said means including an annular assembly of individual race engaging sprags of similar non-circular cross section disposed in the space between said races, said sprags being arranged in sets oriented oppositely in reference to radially spaced portions of each which engage said respective races, one of said portions of the sprags of each set being provided with a rounded wedging surface adapted for fixed gripping engagement or relative sliding engagement in reference to said cylindrical race of said first member, depending upon the direction of relative rotation of said first and further members, the other portion of the sprags of the respective sets being rounded for pivotal and driving engagement in said sockets in the race of said further member for the drive of the latter in one direction or the other through said last named socketed race, corresponding first named portions of one of said sets having gripping engagement with the first named, cylindrical race during the time that corresponding portions of the other set have sliding engagement with that race, and vice versa, means for urging the sprags continuously toward said cylindrical race, and a driver having elements disposed between the respective sets of sprags, which elements are adapted to control said sprags and to drive said further member through said sprags, each element being movable by said driver in opposite circumferential directions to cause that element to engage and tilt a sprag of one or the other sets in the socket of that sprag and away from said gripping engagement upon a relatively slight circumferential movement of the element relative to that sprag, and to engage the tilted sprag adjacent its rounded socket engaging portion to drive the race of said further member through the sprag and its socketed engagement with the last named race, said last named tilting and driving engagements being in substantially the same radial plane normal to the axis of the race members.

2. A two-directional, anti-reverse feedback, torque transmitting device in accordance with claim 1, in which said further member is disposed radially within the cylindrical race of said first member, and in which said rounded sockets of the race of said further member are each formed to provide a portion which to some extent circumferentially and outwardly overhangs the rounded portion of the socketed sprag to tend to restrain the sprag from outward movement from its socket under driving and centrifugal force.

References Cited in the file of this patent

UNITED STATES PATENTS

| | | |
|---|---|---|
| 385,123 | Lake | June 26, 1888 |
| 531,577 | Teal | Dec. 25, 1894 |
| 837,835 | Hicks et al. | Dec. 4, 1906 |
| 945,909 | Chapman | Jan. 11, 1910 |
| 1,141,319 | Coykendall | June 1, 1915 |
| 1,726,329 | Aiken | Aug. 27, 1929 |
| 1,942,472 | Craw | Jan. 9, 1934 |
| 2,240,359 | Weigel | Apr. 29, 1941 |
| 2,251,466 | Payson | Aug. 5, 1941 |
| 2,427,120 | Blair | Sept. 9, 1947 |
| 2,428,968 | Gruenberg | Oct. 14, 1947 |
| 2,615,543 | Maeser | Oct. 28, 1952 |
| 2,879,869 | Dodge | Mar. 31, 1959 |

FOREIGN PATENTS

| | | |
|---|---|---|
| 453,496 | Canada | Dec. 21, 1948 |
| 1,251,514 | France | Dec. 12, 1960 |

OTHER REFERENCES

Product Engineering, pages 62–64, April 24, 1961, vol. 32, No. 8.